(12) United States Patent
Okabe et al.

(10) Patent No.: US 12,216,739 B2
(45) Date of Patent: Feb. 4, 2025

(54) SURFACE PROCESSING SYSTEM

(71) Applicant: Nippon Telegraph and Telephone Corporation, Tokyo (JP)

(72) Inventors: Yuichi Okabe, Tokyo (JP); Toshishige Shimamura, Tokyo (JP); Tsuyoshi Yamamoto, Tokyo (JP); Yuzo Ishii, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 991 days.

(21) Appl. No.: 17/271,167

(22) PCT Filed: Aug. 21, 2019

(86) PCT No.: PCT/JP2019/032570
§ 371 (c)(1),
(2) Date: Feb. 24, 2021

(87) PCT Pub. No.: WO2020/050024
PCT Pub. Date: Mar. 12, 2020

(65) Prior Publication Data
US 2021/0355597 A1    Nov. 18, 2021

(30) Foreign Application Priority Data

Sep. 5, 2018 (JP) .................. 2018-166170

(51) Int. Cl.
*G06F 18/22* (2023.01)
*C25D 21/12* (2006.01)
(Continued)

(52) U.S. Cl.
CPC ............ *G06F 18/22* (2023.01); *C25D 21/12* (2013.01); *G01N 21/27* (2013.01); *G01N 21/31* (2013.01)

(58) Field of Classification Search
CPC ... G06T 7/0004; G06T 7/0006; G06T 7/0008; G06T 7/001; G01N 21/25; G01N 21/27; G01N 21/31; G06F 18/22; C25D 21/12
See application file for complete search history.

(56) References Cited

U.S. PATENT DOCUMENTS

| 4,986,664 A | 1/1991 | Lovoi |
| 2014/0185927 A1 | 7/2014 | Kawabata et al. |

(Continued)

FOREIGN PATENT DOCUMENTS

| JP | S60169600 A | 9/1985 |
| JP | S61117404 A | 6/1986 |

(Continued)

OTHER PUBLICATIONS

Kiyokawa Plating Industry Co., Ltd., "Electroplating and electroless plating," Aug. 13, 2018, 5 pages.

(Continued)

*Primary Examiner* — Margaret G Mastrodonato
(74) *Attorney, Agent, or Firm* — Slater Matsil, LLP

(57) ABSTRACT

An image capturing unit captures an image of a surface of a member treated by a surface treatment unit. A comparison unit obtains a correlation coefficient between a reference image stored in a storage unit and the image captured by the image capturing unit. A cross-correlation coefficient between power spectra of the reference image and the image captured by the image capturing unit is obtained. A control unit stops a surface treatment performed by the surface treatment unit when the correlation coefficient obtained by the comparison unit reaches a set value.

20 Claims, 5 Drawing Sheets

(51) Int. Cl.
  *G01N 21/27* (2006.01)
  *G01N 21/31* (2006.01)

(56) References Cited

U.S. PATENT DOCUMENTS

| | | | |
|---|---|---|---|
| 2015/0221077 A1* | 8/2015 | Kawabata | G06T 7/337 |
| | | | 382/141 |
| 2017/0059302 A1* | 3/2017 | Mantell | H04N 1/02805 |
| 2017/0219495 A1* | 8/2017 | Nagata | G01N 21/95684 |
| 2018/0322621 A1* | 11/2018 | Craeghs | G06T 7/001 |

FOREIGN PATENT DOCUMENTS

| | | |
|---|---|---|
| JP | H0926399 A | 1/1997 |
| JP | 2006208333 A | 8/2006 |
| JP | 2007326062 A | 12/2007 |
| JP | 4049914 B2 | 2/2008 |
| WO | 2012169592 A1 | 12/2012 |

OTHER PUBLICATIONS

"Plastic surface treatment / decoration.com Solution," Jul. 19, 2018, 7 pages.

T. Miwa et al., "Accelerated Corrosion Test of Anticorrosive Coatings Simulating Water Absorption Behavior," NTT Technology Journal, Aug. 13, 2018, 9 pages.

Y. Masuda et al, "R2C Translator to Convert Reflectance into Color," Paint Research, Oct. 2008, 17 pages.

\* cited by examiner

SURFACE PROCESSING SYSTEM

This patent application is a national phase filing under section 371 of PCT/JP2019/032570, filed Aug. 21, 2019, which claims the priority of Japanese patent application 2018-166170, filed Sep. 5, 2018, each of which is incorporated herein by reference in its entirety.

TECHNICAL FIELD

The present invention relates to a surface treatment system for finishing a surface of a member such as a metal member or a building material.

BACKGROUND

Various treatments are performed on a surface of a member, for example, to artificially form an old state, to impart various functions, etc. For example, a technique of forming an antique-like structure by applying a polymer dispersion liquid in which cement is mixed to a surface of concrete has been proposed (see PTL 1).

In addition, since ancient times, various surface treatments have been performed on a surface of a metal member. For example, there is a surface treatment of a metal member used for tableware or the like. For example, western dishes and the like generally use a metal having characteristics such as corrosion resistance, erosion resistance, rust resistance, antirust, and oxidation resistance. Examples of a metal material having a relatively low hardness used for such western tableware include tin and silver which are excellent in appearance and texture. Further, examples of a metal material having a relatively high hardness include stainless metals, stainless steel, titanium, titanium alloys and the like which have excellent durability.

In a case in which a metal material having a relatively high hardness is applied to tableware, plating, coating, or formation of an oxide film is performed on a surface, and surface treatment such as mirror finish polishing is performed thereon. The purpose of performing such surface treatment is to improve appearance, texture, decorativeness, durability, corrosion resistance, erosion resistance, rust resistance, antirust, hardness and the like. Among these, as surface treatments for improving appearance, texture, and decorativeness, texturing, antique finish, satin finish, grain finish, matte treatment, etc. are generally known.

For example, texturing is a treatment of pressing a metal surface using a mold for forming an uneven pattern. Also, antique finish is also called "old-finished" or "weathering" and is a treatment for forming a triiron tetraoxide film on a surface of a metal. Also, satin finish is a treatment of pressing a surface of a metal using a mold for forming it to be rough like a surface of a pear. Also, grain finish and matte treatment are sandblasting processes using a sandblasting device.

CITATION LIST

Patent Literature

[PTL 1] Japanese Patent No. 4049914

Non Patent Literature

[NPL 1] A plating technique of Kiyokawa Plating Industry Co., Ltd., "*Denkai Mekki to Mudenkai Mekki* (Electrolytic plating and electroless plating)", [retrieved on Aug. 13, 2018], (https://www.kiyokawa.co.jp/technology/technology.asp?hed=no).

[NPL 2] Takashi Miwa et al., "*Kyûsuikyodou wo Mogisita Boushyoku Tomaku no Sokusin Husyoku Siken ni Kansuru Torikumi* (Accelerated Corrosion Test for Evaluating the Corrosion Resistance of Coatings)", NIT Gizyutu journal (NIT Technical Journal), R&D trend on life cycle maintenance, 2017.

[NPL 3] A solution of plastic surface treatment and decoration.com, [retrieved on Aug. 13, 2018], (http://plastic-surfacetreatment.com/solution/processing01.html).

[NPL 4] Yutaka Masuda et al., "R2C (Reflectance to Color) Translator to Convert Reflectance into Color", Research on coatings, No. 150, pp. 16-23, 2008.

SUMMARY

Technical Problem

Incidentally, in the surface treatment described above, a treatment state is judged on the basis of human senses. Since human senses vary, they are unsuitable for realizing automation in which uniform products are industrially produced. In addition, differences in texture, feeling, or the like of a material surface may occur between a finished product and an image or computer graphics (CG) model that has been created in advance as a finished product model. There is a deviation between a created model and human perception of texture, and it is not easy to match processed surface states of them. As described above, conventionally, there has been a problem that it is not easy to obtain a target surface treatment state with good reproducibility.

Embodiments of the present invention have been made to solve the above problems, and an object of the present invention is to make it possible to obtain a target surface treatment state with good reproducibility.

Means for Solving the Problem

A surface treatment system according to embodiments of the present invention includes a storage unit configured to store, as a reference image, an image of a target treatment state of a surface of a treatment target member, a surface treatment unit configured to perform a surface treatment on the surface of the member, an image capturing unit configured to capture an image of the surface of the member that is being treated by the surface treatment unit, a comparison unit configured to obtain a correlation coefficient between the reference image stored in the storage unit and the image captured by the image capturing unit, and a control unit configured to stop the surface treatment performed by the surface treatment unit when the correlation coefficient obtained by the comparison unit reaches a set value.

In the surface treatment system, the image capturing unit captures images of the surface of the member in a plurality of different directions, the storage unit stores a plurality of reference images corresponding to the images in respective directions captured by the image capturing unit, and the comparison unit obtains the correlation coefficient between each of the plurality of reference images stored in the storage unit and the corresponding image captured by the image capturing unit.

The surface treatment system includes an image generation unit configured to generate a three-dimensional image of the member from the image captured by the image capturing unit, and the comparison unit obtains the correlation coefficient between the reference image stored in the storage unit and the three-dimensional image generated by the image generation unit.

The surface treatment system includes a reflectance measurement unit configured to measure a reflectance of light of a set wavelength on the surface of the member being treated by the surface treatment unit, and a changing unit configured to change an image capturing condition of the image capturing unit on the basis of the reflectance measured by the reflectance measurement unit.

The surface treatment system includes a reflectance measurement unit configured to measure a reflectance of light of a set wavelength on the surface of the member being treated by the surface treatment unit, and a correction unit configured to correct the image captured by the image capturing unit on the basis of the reflectance measured by the reflectance measurement unit, and the comparison unit obtains the correlation coefficient between the reference image stored in the storage unit and the image corrected by the correction unit.

In the surface treatment system, the reference image stored in the storage unit may be an image obtained by capturing an image of the surface of the member that is in the target treatment state. Further, the reference image stored in the storage unit may be a model image in which the target treatment state is reproduced.

In the surface treatment system, the storage unit may store a plurality of reference images having different treatment states, the surface treatment system may include a display control unit configured to display the plurality of reference images stored in the storage unit on a display unit, and a reception unit configured to receive an instruction input for selecting one of the plurality of reference images displayed on the display unit, and the comparison unit may obtain the correlation coefficient between the reference image corresponding to the instruction input received by the reception unit and the image captured by the image capturing unit.

Effects of Embodiments of the Invention

As described above, since embodiments of the present invention are configured such that the surface treatment is stopped when the correlation coefficient between the image obtained by capturing the surface of the member being processed and the reference image reaches the set value, an excellent effect that the target surface treatment state can be obtained with good reproducibility can be obtained.

DETAILED DESCRIPTION OF ILLUSTRATIVE EMBODIMENTS

A surface treatment system according to an embodiment of the present invention will be described below.

First Embodiment

Figure 1:
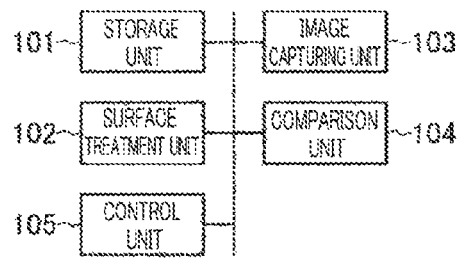
FIG. 1 is a configuration diagram showing a configuration of a surface treatment system according to a first embodiment of the present invention.

First, a surface treatment system according to a first embodiment of the present invention will be described with reference to FIG. 1. This surface treatment system includes a storage unit 101, a surface treatment unit 102, an image capturing unit 103, a comparison unit 104, and a control unit 105.

The storage unit 101 stores, as a reference image, an image of a target treatment state of a surface of a treatment target member. The reference image is an image obtained by capturing an image of the surface of the member that is in the target treatment state. Also, the reference image is a model image created by computer graphics (CG) in which the target treatment state is reproduced.

The surface treatment unit 102 is configured by a device that performs a surface treatment on the surface of the treatment target member. For example, the treatment target member is a metal member, and the surface treatment unit 102 is a plating device that forms plating on the surface of the metal member (see NPL 1). Further, the treatment target member is a metal member, and the surface treatment unit 102 is a device that corrodes the surface of the metal member. For example, a spraying device that sprays a corrosive solution such as saline on the surface of the metal member may be used (see NPL 2).

Also, the treatment target member is a plastic, and the surface treatment unit 102 is a device that processes a surface of the plastic using corona discharge, plasma treatment, blast treatment, or the like (see NPL 3). Further, in a case in which the treatment target member is a plastic or a paper material, the surface treatment unit 102 is a device that radiates ultraviolet light, infrared light, or the like. By such light radiation, aging processing of the plastic and the paper material can be performed.

The image capturing unit 103 captures an image of the surface of the member treated by the surface treatment unit 102. The image capturing unit 103 can be configured by, for example, a digital camera using a solid-state image capturing element. The comparison unit 104 obtains a correlation coefficient between the reference image stored in the storage unit 101 and the image captured by the image capturing unit 103. The comparison unit 104 first performs a Fourier transform on the image captured (imaged) by the image capturing unit 103 to calculate a power spectrum. Further, the comparison unit 104 also performs a Fourier transform on the reference image stored in the storage unit to calculate the power spectrum. The comparison unit 104 obtains a cross-correlation coefficient of these two power spectra.

The surface treatment unit 102 is, for example, a plating device that forms plating on the surface of the metal member. In a case in which this plating device includes a mechanism for lifting the treatment target from a plating bath, the comparison unit 104 activates the lifting mechanism every set time, lifts up the treatment target from the plating bath, suspends the treatment, and then causes the image capturing unit 103 to capture an image of the surface of the treatment target member. By doing so, captured images of the surface of the member being treated by the surface treatment unit 102 are obtained in time series. The images thus obtained at each set time are processed and each is compared with the reference image.

The control unit 105 stops the surface treatment performed by the surface treatment unit 102 when the correlation coefficient obtained by the comparison unit 104 reaches a set value. The control unit 105 stops the surface treatment performed by the surface treatment unit 102, for example, when the correlation coefficient reaches the maximum value. For example, the surface treatment is stopped when the cross-correlation coefficient starts to decrease while it has increased with the lapse of time. Further, for example, the surface treatment may be stopped at the time when the correlation coefficient becomes a value 10% lower than the maximum value or a value in which the correlation is reduced by a standard deviation. For example, a treatment test may be performed in advance to collect data, and the set value may be determined from the collected data. Also, the surface treatment may be stopped after a set time from the time when the correlation coefficient reaches the maximum value.

The surface treatment unit 102 is, for example, a plating device that forms plating on the surface of the metal member. In a case in which this plating device includes a mechanism for lifting the treatment target from a plating bath, the control unit 105 activates the lifting mechanism to lift up the treatment target from the plating bath and stops the treatment. Further, in a case in which the plating device performs a plating process by electrolytic plating, the control unit 105 stops energizing in the electrolytic plating and stops the plating process. Also, in a case in which the surface treatment unit 102 is a spraying device that sprays a corrosion solution onto the surface of the metal member, the control unit 105 stops spraying the corrosion solution and starts spraying a cleaning liquid.

According to the surface treatment system according to the first embodiment described above, since the image of the surface being surface-treated is compared with the reference image by the comparison unit, a target surface treatment state can be obtained with good reproducibility as compared with the case in which the treatment state is judged on the basis of human senses.

The image capturing unit 103 may capture images of the surface of the member in a plurality of different directions, and the comparison unit 104 may obtain the correlation coefficient between each of a plurality of reference images stored in the storage unit 101 and the corresponding image captured by the image capturing unit 103. A plurality of images may be obtained by moving the image capturing unit 103 and capturing the surface of the member in a plurality of different directions. Further, images of the surface of the member may be captured in a plurality of different directions by using a plurality of image capturing units 103 disposed at different positions. The plurality of reference images may be stored in the storage unit 101 in correspondence with the images captured by the image capturing unit 103 in the respective directions.

By doing so, accuracy of the correlation coefficient obtained by the comparison unit 104 can be increased, and reproducibility of the finish when the processing ends can be improved. For example, the control unit 105 may stop the surface treatment performed by the surface treatment unit 102 when the highest correlation coefficient among the plurality of correlation coefficients obtained by the comparison unit 104 reaches the set value.

Second Embodiment

Figure 2:
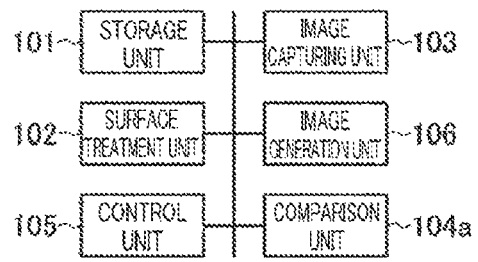
FIG. 2 is a configuration diagram showing a configuration of a surface treatment system according to a second embodiment of the present invention.

Next, a surface treatment system according to a second embodiment of the present invention will be described with reference to FIG. 2. This surface treatment system includes the storage unit 101, the surface treatment unit 102, the image capturing unit 103, a comparison unit 104a, the control unit 105, and an image generation unit 106.

The storage unit 101 stores, as the reference image, an image of a target treatment state of the surface of the treatment target member. The surface treatment unit 102 is configured by a device that performs a surface treatment on the surface of the treatment target member. The image capturing unit 103 captures the surface of the member being treated by the surface treatment unit 102. The comparison unit 104a obtains a correlation coefficient between the reference image stored in the storage unit 101 and the image captured by the image capturing unit 103. The control unit 105 stops the surface treatment performed by the surface treatment unit 102 when the correlation coefficient obtained by the comparison unit 104a reaches a set value. The surface treatment unit 102, the image capturing unit 103, and the control unit 105 are the same as those in the first embodiment described above.

In the second embodiment, the image generation unit 106 generates a three-dimensional image of the member from the image captured by the image capturing unit 103. The comparison unit 104a obtains a correlation coefficient between the reference image stored in the storage unit 101 and the three-dimensional image generated by the image generation unit 106.

The image generation unit 106 uses, for example, a visual volume intersection method to generate a three-dimensional model image of the member being processed from the image captured by the image capturing unit 103. For the three-dimensional model image generated here, in the second embodiment, the storage unit 101 stores a reference image based on the three-dimensional model image. For example, it may be a CG generated on the basis of measurement results of a reflectance and an illuminance of the surface of the member that is in the target treatment state. Since lighting conditions and a reflectance of a target object may be unclear in the case of a photographic image created by a digital camera, the CG generated in a state in which all conditions are known may be set as the reference image.

The comparison unit 104a obtains correlations between the three-dimensional images. In a case in which the reference image is a CG, the image generation unit 106 may convert the three-dimensional model image into a CG, and the comparison unit 104a may compare the CGs. By doing so, a slight deviation in texture and feeling between an actual image and the CG can be eliminated. By using the CG as the reference image, the target surface treatment state can be obtained with good reproducibility even when there is no actual image as the reference image.

Third Embodiment

Figure 3:
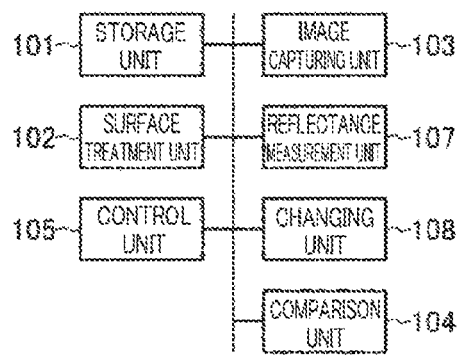
FIG. 3 is a configuration diagram showing a configuration of a surface treatment system according to a third embodiment of the present invention.

Next, a surface treatment system according to a third embodiment of the present invention will be described with reference to FIG. 3. This surface treatment system includes the storage unit 101, the surface treatment unit 102, the image capturing unit 103, the comparison unit 104, the control unit 105, a reflectance measurement unit 107, and a changing unit 108. The storage unit 101, the surface treatment unit 102, the image capturing unit 103, the comparison unit 104, and the control unit 105 are the same as those in the first embodiment described above.

The reflectance measurement unit 107 measures a reflectance of light of a set wavelength on the surface of the member being treated by the surface treatment unit 102. The reflectance measurement unit 107 includes, for example, a broadband light source whose wavelength characteristics are known in advance, a spectroscopic unit such as a prism that splits the light from the light source into a monochromatic light source, and a light detection unit such as a digital camera. The surface of the member is irradiated with the light source changed to a monochromatic light in the spectroscopic unit, the reflected light is detected by the light detection unit, and a reflection intensity for each wavelength is measured. Also, the reflectance measurement unit 107 can also be configured by a broadband light source and a photodetector unit including an active wavelength filter. The photodetector unit including the active wavelength filter measures the reflection intensity for each wavelength.

The changing unit 108 changes image capturing conditions of the image capturing unit 103 on the basis of the reflectance measured by the reflectance measurement unit 107 (see NPL 4). By doing so, it is possible to interpolate an influence of illumination at the time of image capturing in the image capturing unit 103, and improve accuracy of the correlation coefficient obtained by the comparison unit 104.

Fourth Embodiment

Figure 4:
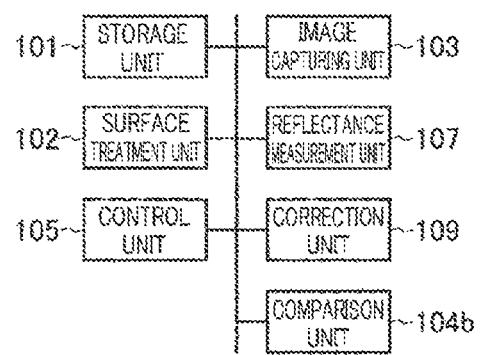
FIG. 4 is a configuration diagram showing a configuration of a surface treatment system according to a fourth embodiment of the present invention.

Next, a surface treatment system according to a fourth embodiment of the present invention will be described with reference to FIG. 4. This surface treatment system includes the storage unit 101, the surface treatment unit 102, the image capturing unit 103, the comparison unit 104b, the control unit 105, the reflectance measurement unit 107, and a correction unit 109. The storage unit 101, the surface treatment unit 102, the image capturing unit 103, and the control unit 105 are the same as those in the first embodiment described above. The reflectance measurement unit 107 is the same as that in the third embodiment described above.

In the fourth embodiment, the correction unit 109 corrects the image captured by the image capturing unit 103 on the basis of the reflectance measured by the reflectance measurement unit 107 (see NPL 4). The comparison unit 104b obtains a correlation coefficient between the reference image stored in the storage unit 101 and the image corrected by the correction unit 109. By doing so, it is possible to interpolate an influence of illumination at the time of image capturing in the image of the member captured by the image capturing unit 103 and improve accuracy of the correlation coefficient obtained by the comparison unit 104b.

Fifth Embodiment

Figure 5:
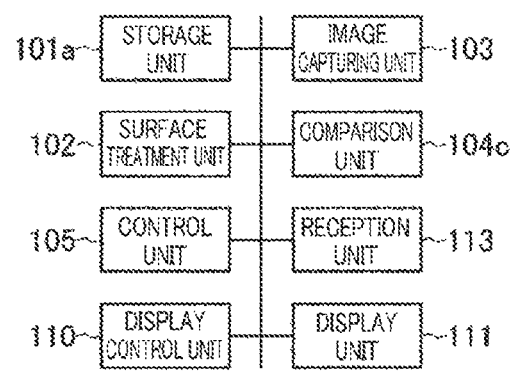
FIG. 5 is a configuration diagram showing a configuration of a surface treatment system according to a fifth embodiment of the present invention.

Next, a surface treatment system according to a fifth embodiment of the present invention will be described with reference to FIG. 5. This surface treatment system includes the storage unit 101a, the surface treatment unit 102, the image capturing unit 103, the comparison unit 104c, the control unit 105, a display control unit 110, a display unit 111, and a reception unit 113.

The surface treatment unit 102 is configured by a device that performs a surface treatment on the surface of the treatment target member. The surface treatment unit 102 is the same as that in the first to fourth embodiments described above. The image capturing unit 103 images the surface of the member being treated by the surface treatment unit 102. The image capturing unit 103 is the same as that in the first to fourth embodiments described above. The control unit 105 stops the surface treatment performed by the surface treatment unit 102 when the correlation coefficient obtained by the comparison unit 104c reaches the set value. Control performed by the control unit 105 is the same as that in the first to fourth embodiments described above.

In the fifth embodiment, the storage unit 101a stores a plurality of reference images having different treatment states. Each reference image is the same as that in the first to fourth embodiments described above.

The display control unit no causes the display unit 111 to display the plurality of reference images stored in the storage unit Iola.

The reception unit 113 receives an instruction input for selecting one of the plurality of reference images displayed on the display unit 111. For example, the display unit 111 is a well-known touch panel, and by touching a portion corresponding to any of the reference images displayed on the display unit 111, an instruction input is made and received by the reception unit 113.

In the fifth embodiment, the comparison unit 104c obtains the correlation coefficient between the reference image corresponding to the instruction input received by the reception unit 113 and the image captured by the image capturing unit 103.

The surface treatment system according to the fifth embodiment may include an accommodation unit which accommodates a large number of treatment target members as product materials and a conveyance mechanism with which, when the reception unit 113 receives a selection instruction, the product materials are conveyed from the accommodation unit to the surface treatment unit 102. Further, the conveyance mechanism conveys the product materials that have been treated by the surface treatment unit 102 to a product take-out unit.

When the reception unit 113 receives the selection instruction, the conveyance mechanism conveys the product material to the surface treatment unit 102. For example, receiving money enables the selection instruction to the reception unit 113. In the surface treatment unit 102, when the product materials are conveyed by (conveyed in) the conveyance mechanism, the surface treatment is automatically started, and the surface treatment is stopped by control of the control unit 105. When the surface treatment performed by the surface treatment unit 102 is stopped, the treated product material is conveyed to a product take-out unit by the conveyance mechanism. According to the fifth embodiment, it is possible to provide a user with a product that has been finished as the user desires.

As described above, according to embodiments of the present invention, since the surface treatment is stopped when the correlation coefficient between the image obtained by capturing the surface of the member being treated and the reference image reaches the set value, a target surface treatment state can be obtained with good reproducibility.

Further, it should be apparent that the present invention is not limited to the embodiments described above, and various modifications and combinations can be made by those skilled in the art within the technical concept of the present invention. For example, the configuration of the system of the fifth embodiment can be combined not only with the system of the first embodiment but also with any of the systems of the second to fourth embodiments.

The invention claimed is:
1. A surface treatment system comprising:
a storage configured to store reference images of a surface of a treatment target member, the reference images capturing a plurality of different final target treatment states of the surface of the treatment target member;

a surface treater configured to perform a surface treatment on the surface of the treatment target member based on a selection instruction received from a user, the selection instruction indicating a selected final target treatment state from the plurality of different final target treatment states;

an image recorder configured to capture an image of the surface of the treatment target member being treated by the surface treater;

a comparer configured to obtain a correlation coefficient between the reference image for the selected final target treatment state stored in the storage and the image captured by the image recorder; and a controller configured to stop the surface treatment performed by the surface treater in response to the correlation coefficient obtained by the comparer reaching a set value.

2. The surface treatment system according to claim 1, wherein the image recorder is configured to capture images of the surface of the treatment target member in a plurality of different directions, the storage is configured to store a plurality of reference images corresponding to the images in respective directions captured by the image recorder, and the comparer is configured to obtain a correlation coefficient between each of the plurality of reference images stored in the storage and the corresponding image captured by the image recorder.

3. The surface treatment system according to claim 1, further comprising an image generator configured to generate a three-dimensional image of the treatment target member from the image captured by the image recorder, wherein the comparer is configured to obtain the correlation coefficient between the reference image for the selected final target treatment state stored in the storage and the three-dimensional image generated by the image generator.

4. The surface treatment system according to claim 3, further comprising:
a reflectance measurer configured to measure a reflectance of light of a set wavelength on the surface of the target treatment member being treated by the surface treater; and
a changer configured to change an image capturing condition of the image recorder based on the reflectance measured by the reflectance measurer; or
a corrector configured to correct the image captured by the image recorder based on the reflectance measured by the reflectance measurer, wherein the comparer is configured to obtain the correlation coefficient between the reference image for the selected final target treatment state stored in the storage and the image corrected by the corrector.

5. The surface treatment system according to claim 1, further comprising:
a reflectance measurer configured to measure a reflectance of light of a set wavelength on the surface of the target treatment member being treated by the surface treater; and
a changer configured to change an image capturing condition of the image recorder based on the reflectance measured by the reflectance measurer; or
a corrector configured to correct the image captured by the image recorder based on the reflectance measured by the reflectance measurer, wherein the comparer is configured to obtain the correlation coefficient between the reference image for the selected final target treatment state stored in the storage and the image corrected by the corrector.

6. The surface treatment system according to claim 1, wherein the reference images stored in the storage are images obtained by capturing images of the surface of the target treatment member in each of the plurality of different final target treatment states.

7. The surface treatment system according to claim 1, wherein the reference images stored in the storage are model images in which each of the plurality of different final target treatment states is reproduced.

8. The surface treatment system according to claim 1, further comprising:
a display controller configured to display the reference images stored in the storage on a display unit; and
a receptor configured to receive an instruction input for selecting the reference image of the reference images displayed on the display unit corresponding to the selected final target treatment state, wherein the comparer is configured to obtain the correlation coefficient between the reference image corresponding to the instruction input received by the receptor and the image captured by the image recorder.

9. The surface treatment system according to claim 1, further comprising a conveyance mechanism configured to move the treatment target member from an accommodation device to the surface treater based on the selection instruction received from the user and from the surface treater to a product take-out area accessible to the user following completion of the surface treatment.

10. The surface treatment system according to claim 1, wherein:
the target treatment member comprises a metal member and the surface treatment comprises a plating treatment or a corroding treatment; or
the target treatment member comprises a plastic or a paper material and the surface treatment comprises an aging treatment using corona discharge, a plasma treatment, a blast treatment, irradiation with an ultraviolet light, or irradiation with an infrared light.

11. A surface treatment method comprising:
storing in a storage reference images of a surface of a treatment target member, the reference images capturing a plurality of different final target treatment states of the surface of the treatment target member;
performing, by a surface treater, a surface treatment on the surface of the treatment target member based on a selection instruction received from a user, the selection instruction indicating a selected final target treatment state from the plurality of different final target treatment states;
capturing, by an image recorder, an image of the surface of the treatment target member being treated by the surface treater;
obtaining, by a comparer, a correlation coefficient between the reference image for the selected final target treatment state stored in the storage and the image captured by the image recorder; and
stopping, by a controller, the surface treatment performed by the surface treater in response to the correlation coefficient obtained by the comparer reaching a set value.

12. The surface treatment method according to claim 11, wherein the image recorder captures images of the surface of the treatment target member in a plurality of different directions, the storage stores a reference images corresponding to the images in respective directions captured by the image recorder, and the comparer obtains the correlation coefficient between each of the reference images stored in the storage and the corresponding image captured by the image recorder.

13. The surface treatment method according to claim 11, further comprising generating, by an image generator, a three-dimensional image of the treatment target member from the image captured by the image recorder, wherein the comparer obtains the correlation coefficient between the reference image for the selected final target treatment state stored in the storage and the three-dimensional image generated by the image generator.

14. The surface treatment method according to claim 11, further comprising:
measuring, by a reflectance measurer, a reflectance of light of a set wavelength on the surface of the target treatment member being treated by the surface treater; and
changing an image capturing condition of the image recorder based on the reflectance measured by the reflectance measurer; or
correcting, by a corrector, the image captured by the image recorder based on the reflectance measured by the reflectance measurer, wherein the comparer obtains the correlation coefficient between the reference image for the selected final target treatment state stored in the storage and the image corrected by the corrector.

15. The surface treatment method according to claim 11, wherein the reference images stored in the storage are images obtained by capturing images of the surface of the target treatment member in each of the plurality of different final target treatment states.

16. The surface treatment method according to claim 11, wherein the reference images stored in the storage are model images in which each of the plurality of different final target treatment states is reproduced.

17. The surface treatment method according to claim 16, further comprising:
displaying, by a display controller, the reference images stored in the storage on a display unit; and
receiving, by a receptor, an instruction input for selecting the reference image of the reference images displayed on the display unit corresponding to the selected final target treatment state, wherein the comparer obtains the correlation coefficient between the reference image corresponding to the instruction input received by the receptor and the image captured by the image recorder.

18. The surface treatment method according to claim 11, further comprising:
displaying, by a display controller, the reference images stored in the storage on a display unit; and
receiving, by a receptor, an instruction input for selecting the reference image of the reference images displayed on the display unit corresponding to the selected final target treatment state, wherein the comparer obtains the correlation coefficient between the reference image corresponding to the instruction input received by the receptor and the image captured by the image recorder.

19. The surface treatment method according to claim 11, further comprising moving, by a conveyance mechanism, the treatment target member from an accommodation device to the surface treater based on the selection instruction received from the user and from the surface treater to a product take-out area accessible to the user following completion of the surface treatment.

20. The surface treatment method according to claim 11, wherein:
the target treatment member comprises a metal member and the surface treatment comprises a plating treatment or a corroding treatment; or
the target treatment member comprises a plastic or a paper material and the surface treatment comprises an aging treatment using corona discharge, a plasma treatment, a blast treatment, irradiation with an ultraviolet light, or irradiation with an infrared light.

\* \* \* \* \*